(12) United States Patent
Woodell et al.

(10) Patent No.: US 7,859,449 B1
(45) Date of Patent: Dec. 28, 2010

(54) SYSTEM AND METHOD FOR A TERRAIN DATABASE AND/OR POSITION VALIDATION

(75) Inventors: Daniel L. Woodell, Cedar Rapids, IA (US); Richard D. Jinkins, Rewey, WI (US); Nathanael A. Meyer, Coralville, IA (US); Richard M. Rademaker, Rijswijk ZH (NL); Charles J. Dickerson, Alburnett, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 692 days.

(21) Appl. No.: 11/900,002

(22) Filed: Sep. 6, 2007

(51) Int. Cl.
*G01S 13/08* (2006.01)
*G01S 13/93* (2006.01)

(52) U.S. Cl. .................. 342/65; 342/26 R; 342/26 B

(58) Field of Classification Search ............ 342/65, 342/26 R, 26 B, 123, 195
See application file for complete search history.

(56) References Cited

U.S. PATENT DOCUMENTS

| | | | |
|---|---|---|---|
| 2,930,035 A | 3/1960 | Altekruse | |
| 2,965,894 A | 12/1960 | Sweeney | |
| 2,994,966 A | 8/1961 | Senitsky et al. | |
| 3,153,234 A | 10/1964 | Begeman et al. | |
| 3,212,088 A | 10/1965 | Alexander et al. | |
| 3,241,141 A | 3/1966 | Wall | |
| 3,325,807 A | 6/1967 | Burns et al. | |
| 3,397,397 A | 8/1968 | Barney | |
| 3,739,380 A | 6/1973 | Burdic et al. | |
| 3,815,132 A | 6/1974 | Case, Jr. et al. | |
| 4,760,396 A | 7/1988 | Barney et al. | |
| 5,920,276 A | 7/1999 | Frederick | |
| 5,945,926 A * | 8/1999 | Ammar et al. | 340/970 |
| 5,978,715 A | 11/1999 | Briffe et al. | |
| 6,064,942 A | 5/2000 | Johnson et al. | |
| 6,128,553 A | 10/2000 | Gordon et al. | |
| 6,150,901 A | 11/2000 | Auken | |
| 6,154,151 A | 11/2000 | McElreath et al. | |
| 6,163,021 A | 12/2000 | Mickelson | |
| 6,166,661 A | 12/2000 | Anderson et al. | |
| 6,169,770 B1 | 1/2001 | Henely | |
| 6,178,391 B1 | 1/2001 | Anderson et al. | |
| 6,194,980 B1 | 2/2001 | Thon | |
| 6,201,494 B1 | 3/2001 | Kronfeld | |

(Continued)

OTHER PUBLICATIONS

Fountain, J.R., Digital Terrain Systems, Airborne Navigation Systems Workshop (Digest No. 1997/169), IEE Colloquium, pp. 4/1-4/6, Feb. 21, 1997.

(Continued)

*Primary Examiner*—John B Sotomayor
(74) *Attorney, Agent, or Firm*—Matthew J. Evans; Daniel M. Barbieri

(57) ABSTRACT

An aircraft weather radar system can be used with a terrain avoidance system. The aircraft weather radar system is coupled to an antenna. A processor receives radar returns received by the antenna. The processor determines terrain elevation estimates for use with the terrain avoidance system from the radar returns. The terrain elevation estimates are compared to stored terrain elevation data used with the terrain avoidance system to verify position or to check the integrity of the stored elevation data. The processor can be part of a terrain avoidance system, a weather radar system, a navigation system, or can be a standalone system.

20 Claims, 4 Drawing Sheets

U.S. PATENT DOCUMENTS

| | | | |
|---|---|---|---|
| 6,233,522 B1 | 5/2001 | Morici |
| 6,259,400 B1 | 7/2001 | Higgins et al. |
| 6,266,114 B1 | 7/2001 | Skarohlid |
| 6,281,832 B1 | 8/2001 | McElreath |
| 6,285,298 B1 | 9/2001 | Gordon |
| 6,285,337 B1 | 9/2001 | West et al. |
| 6,285,926 B1 | 9/2001 | Weiler et al. |
| 6,311,108 B1 | 10/2001 | Ammar et al. |
| 6,317,468 B1 | 11/2001 | Meyer |
| 6,345,127 B1 | 2/2002 | Mitchell |
| 6,377,892 B1 | 4/2002 | Johnson et al. |
| 6,388,607 B1 | 5/2002 | Woodell |
| 6,388,608 B1 | 5/2002 | Woodell et al. |
| 6,424,288 B1 | 7/2002 | Woodell |
| 6,426,717 B1 | 7/2002 | Maloratsky |
| 6,441,773 B1 | 8/2002 | Kelly et al. |
| 6,448,922 B1 | 9/2002 | Kelly |
| 6,452,511 B1 | 9/2002 | Kelly et al. |
| 6,456,236 B1 | 9/2002 | Hauck et al. |
| 6,473,240 B1 | 10/2002 | Dehmlow |
| 6,492,934 B1 | 12/2002 | Hwang et al. |
| 6,501,424 B1 | 12/2002 | Haendel et al. |
| 6,512,476 B1 | 1/2003 | Woodell |
| 6,525,674 B1 | 2/2003 | Kelly et al. |
| 6,531,669 B1 | 3/2003 | Miller et al. |
| 6,549,161 B1 | 4/2003 | Woodell |
| 6,567,728 B1 | 5/2003 | Kelly et al. |
| 6,574,030 B1 | 6/2003 | Mosier |
| 6,577,947 B1 | 6/2003 | Kronfeld et al. |
| 6,603,425 B1 | 8/2003 | Woodell |
| 6,650,275 B1 | 11/2003 | Kelly et al. |
| 6,653,947 B2 | 11/2003 | Dwyer et al. |
| 6,690,298 B1 | 2/2004 | Barber et al. |
| 6,690,299 B1 | 2/2004 | Suiter |
| 6,714,186 B1 | 3/2004 | Mosier et al. |
| 6,741,203 B1 | 5/2004 | Woodell |
| 6,741,208 B1 | 5/2004 | West et al. |
| 6,744,382 B1 | 6/2004 | Lapis et al. |
| 6,744,408 B1 | 6/2004 | Stockmaster |
| 6,757,624 B1 | 6/2004 | Hwang et al. |
| 6,771,626 B1 | 8/2004 | Golubiewski et al. |
| 6,804,614 B1 | 10/2004 | McGraw et al. |
| 6,806,846 B1 | 10/2004 | West |
| 6,819,983 B1 | 11/2004 | McGraw |
| 6,822,617 B1 | 11/2004 | Mather et al. |
| 6,839,017 B1 | 1/2005 | Dillman |
| 6,850,185 B1 | 2/2005 | Woodell |
| 6,862,501 B2 | 3/2005 | He |
| 6,865,452 B2 | 3/2005 | Burdon |
| 6,879,280 B1 | 4/2005 | Bull et al. |
| 6,882,302 B1 | 4/2005 | Woodell et al. |
| 6,918,134 B1 | 7/2005 | Sherlock et al. |
| 6,950,062 B1 | 9/2005 | Mather et al. |
| 6,972,727 B1 | 12/2005 | West et al. |
| 6,977,608 B1 | 12/2005 | Anderson et al. |
| 6,995,726 B1 | 2/2006 | West et al. |
| 6,998,908 B1 | 2/2006 | Sternowski |
| 6,999,022 B1 | 2/2006 | Vesel et al. |
| 7,002,546 B1 | 2/2006 | Stuppi et al. |
| 7,034,753 B1 | 4/2006 | Elsallal et al. |
| 7,042,387 B2 | 5/2006 | Ridenour et al. |
| 7,064,680 B2 | 6/2006 | Reynolds et al. |
| 7,089,092 B1 | 8/2006 | Wood et al. |
| 7,092,645 B1 | 8/2006 | Sternowski |
| 7,109,912 B1 | 9/2006 | Paramore et al. |
| 7,109,913 B1 | 9/2006 | Paramore et al. |
| 7,129,885 B1 | 10/2006 | Woodell et al. |
| 7,148,816 B1 | 12/2006 | Carrico |
| 7,151,507 B1 | 12/2006 | Herting |
| 7,158,072 B1 | 1/2007 | Venkatachalam et al. |
| 7,161,525 B1 | 1/2007 | Finley et al. |
| 7,170,446 B1 | 1/2007 | West et al. |
| 7,196,329 B1 | 3/2007 | Wood et al. |
| 7,205,933 B1 | 4/2007 | Snodgrass |
| 7,219,011 B1 | 5/2007 | Barber |
| 7,242,343 B1 | 7/2007 | Woodell |
| 7,272,472 B1 | 9/2007 | McElreath |
| 7,292,178 B1 | 11/2007 | Woodell et al. |
| 7,312,725 B2 | 12/2007 | Berson et al. |
| 7,312,743 B2 | 12/2007 | Ridenour et al. |
| 7,486,291 B2 | 2/2009 | Berson et al. |
| 7,570,177 B2 | 8/2009 | Reynolds et al. |
| 7,633,430 B1 * | 12/2009 | Wichgers et al. ............. 342/65 |
| 7,639,175 B1 * | 12/2009 | Woodell .................... 342/123 |
| 7,675,461 B1 * | 3/2010 | McCusker et al. .......... 342/179 |
| 7,783,427 B1 * | 8/2010 | Woodell et al. ............ 701/301 |
| 2003/0071828 A1 | 4/2003 | Wilkins et al. |
| 2003/0216859 A1 | 11/2003 | Martell et al. |
| 2004/0044445 A1 | 3/2004 | Burdon |
| 2004/0059473 A1 | 3/2004 | He |
| 2004/0083038 A1 | 4/2004 | He |
| 2004/0181318 A1 | 9/2004 | Redmond et al. |
| 2005/0174350 A1 | 8/2005 | Ridenour et al. |
| 2006/0097895 A1 | 5/2006 | Reynolds et al. |
| 2006/0227012 A1 | 10/2006 | He |
| 2006/0290531 A1 | 12/2006 | Reynolds et al. |
| 2009/0207048 A1 | 8/2009 | He et al. |
| 2010/0033499 A1 | 2/2010 | Gannon et al. |

OTHER PUBLICATIONS

Johnson, A., et al., Vision Guided Landing of an Autonomous Helicopter in Hazardous Terrain, Robotics and Automation, 2005. ICRA 2005. Proceedings of the 2005 IEEE International Conference on Robotics and Automation, pp. 3966-3971, Apr. 18-22, 2005.

Vadlamani, A., et al., Improving the detection capability of spatial failure modes using downward-looking sensors in terrain database integrity monitors, Digital Avionics Systems Conference, 2003. The 22nd, vol. 2, pp. 9.C.5-1 to 9.C.5-12, vol. 2, Oct. 12-16, 2003.

Technical Standard Order, TSO-C115b, Airborne Area Navigation Equipment Using Multi-Sensor Inputs, Sep. 30, 1994, 11 pages, Department of Transportation, Federal Aviation Administration, Washington, DC.

* cited by examiner

SYSTEM AND METHOD FOR A TERRAIN DATABASE AND/OR POSITION VALIDATION

CROSS-REFERENCE TO RELATED APPLICATIONS

This application is related to U.S. application Ser. No. 11/899,801 entitled "TERRAIN AVOIDANCE SYSTEM AND METHOD USING WEATHER RADAR FOR TERRAIN DATABASE GENERATION" filed on an even date herewith by Woodell et al. and U.S. application Ser. No. 11/851,323, entitled "METHOD FOR SENSOR-BASED TERRAIN AVOIDANCE" filed on an even date by McCusker, both assigned to the Assignee of this patent application and incorporated herein by reference.

BACKGROUND OF THE INVENTION

The present specification relates to terrain warning systems. Conventionally, pilots use terrain warning systems such as terrain awareness and warning systems (TAWS), ground proximity warning systems (GPWS), and enhanced GPWS (EGPWS). Terrain warning systems have been designed to provide critical information to pilots and flight crews to reduce aviation accidents related to controlled flight into terrain.

Terrain warning systems generally can provide visual and audio warnings to prevent controlled flight into terrain. Terrain warning systems generally are coupled with a visual display and an audio system and receive positional information related to the aircraft's actual or relative position. Terrain warning systems receive various input criteria about location (e.g., latitude, longitude, and altitude) of the aircraft as well as its speed and direction of travel (e.g., heading). Terrain warning systems map the input criteria to a terrain database. The result can be used to indicate that the aircraft is in danger of hitting the terrain as represented by the terrain database.

The visual or audio warning issued by the terrain warning system can include instructions for evasive maneuvers to the pilot. The warnings can be generated from a conventional terrain awareness algorithm or from a radio altitude/aircraft state system.

The terrain warning system can receive input criteria from a variety of sources. For example, the aircraft's position can be provided by a flight management system, a global positioning system, an inertial navigation system, pilot input, or any other position sensing device. In addition, redundant sensors can be utilized. For example, altitude can be determined both from a GPS system and an onboard altimeter.

The terrain database can be referenced to particular locations (e.g., latitude, longitude, altitude, etc.) and stored on non-volatile memory such as hard drives. Some databases are local or regional while others are global. Generally, conventional terrain warning systems have utilized databases based upon information generated prior to the flight of the aircraft. Some of the data can be relatively old and require updated information related to man-made objects, such as buildings, radio towers, bridges, etc. Such systems can be prone to false alarms due to database inaccuracy/resolution and missed hazardous states due to new terrain obstacle/features. Further, certain countries may not even maintain obstacle databases.

Navigation systems such as inertial navigation systems, GPS systems, and other devices for determining location can suffer from inaccuracy. Accordingly, there is a need for a combination navigation solution and terrain database that can be validated for certain safety driven, high availability systems. For example, systems which utilize pre-dictate flight decisions can benefit from a validated navigation/database solution. Current terrain awareness systems are advisory only and are not to be used for flight path decisions.

Accordingly, there is a need for a system that can validate position and/or a terrain database for a TAWS or GPWS. There is also a need to determine whether a terrain elevation database or positioning is accurate using an existing aircraft sensor. There is further a need to sense terrain in real time or pseudo real time for a terrain warning system. Yet further, there is a need for an accurate low cost method of verifying position or terrain data in a terrain elevation database.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY OF THE INVENTION

An exemplary embodiment relates to a method of using a terrain avoidance system on an aircraft. The method includes generating estimates representing terrain elevation using the weather radar system, and receiving data from the terrain elevation database. The method also includes providing a warning if the estimates and the data indicate a position error, an error in the elevation estimates, or error in the elevation database.

Another exemplary embodiment relates to an aircraft weather radar system for use with a terrain avoidance system. The weather radar system is coupled to an antenna. The weather radar system includes a processor for receiving radar returns received by the antenna. The processor determines terrain elevation data for the terrain avoidance system from the radar returns. The terrain elevation data is compared to the stored data used with the terrain avoidance system to verify position or to check the integrity of the stored data.

Another exemplary embodiment relates to an apparatus for an aircraft terrain avoidance system. The apparatus includes a first input for receiving terrain elevation estimates derived from a weather radar system, a second input for receiving terrain elevation data stored onboard the aircraft, and a means for comparing the terrain elevation estimates derived from a weather radar system and the terrain elevation data stored onboard the aircraft.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
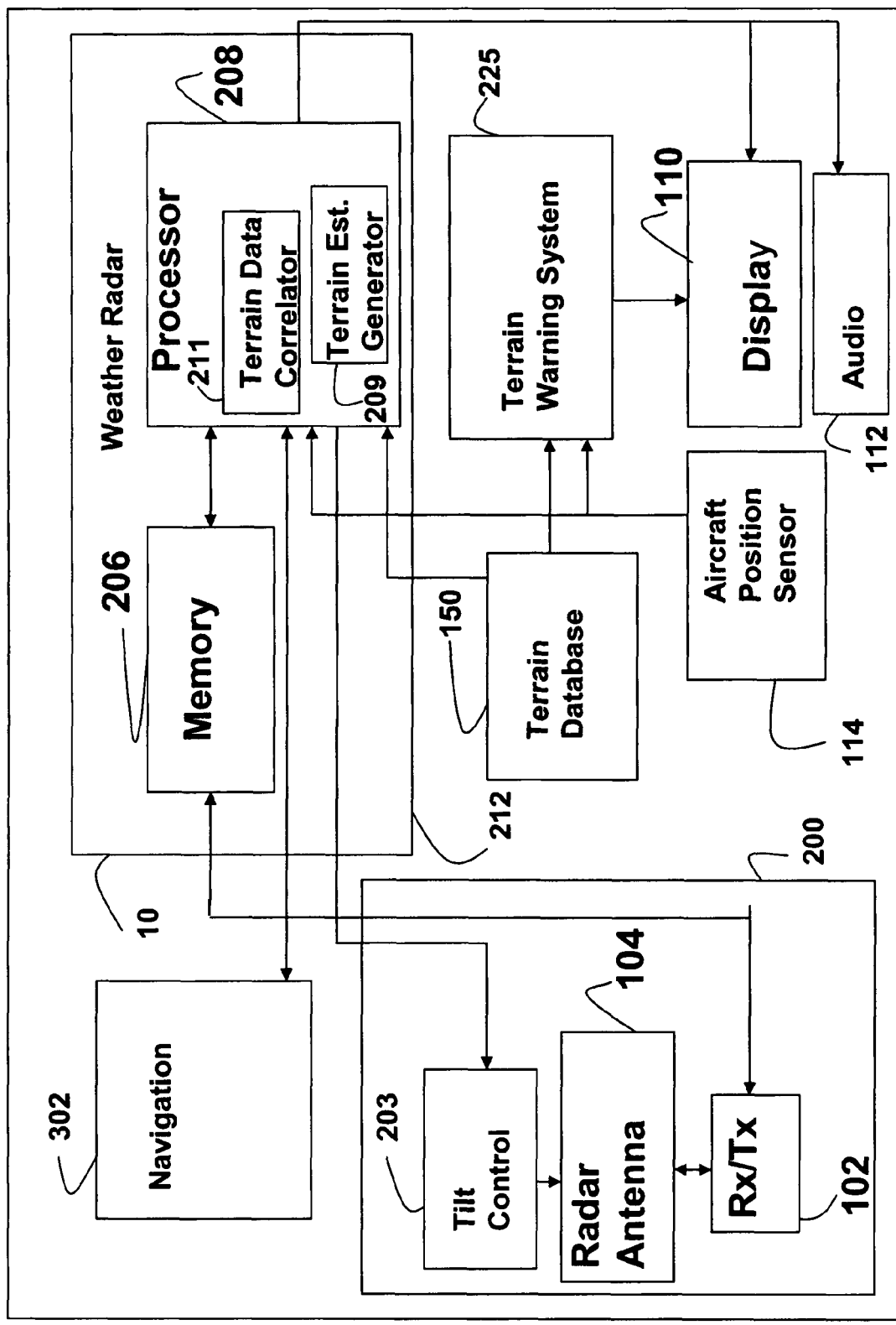
FIG. 1 is a general block diagram of a terrain warning system and a weather radar system including a terrain data correlator in accordance with an exemplary embodiment.

Before describing in detail the particular improved system and method, it should be observed that the invention includes, but is not limited to a novel structural combination of conventional data/signal processing components and circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIG. 1, an aircraft 100 includes a weather radar system 10, an antenna system 200, a navigation system 302 (e.g., flight management system, global position system (GPS) receiver, inertial navigation system, etc.) and a terrain warning system 225. Weather radar system 10 via antenna system 200 is capable of casting a radar beam(s) and receiving reflective energy from weather systems, terrain, and other obstacles. Weather radar system 10 preferably provides the beam and receives reflectivity energy from various targets while information is accumulated in a local database and is available for processing by correlator 211.

Weather radar system 10 can be similar to the system described in U.S. Pat. No. 6,388,608. Alternatively, weather radar system 10 can be a radar-based windshear detection system or a monopulse radar system.

Advantageously, system 10 is capable of providing or generating terrain elevation estimates or elevation data via terrain elevation estimate generator 209 for use by a terrain data correlator 211 disposed in system 10. In one embodiment, terrain elevation estimate generator 209 is part of system 10 and generates terrain elevation estimates for correlator 211. Correlator 211 can be located in system 10, or terrain warning system 225. According to one embodiment, correlator 211 can provide a warning or alarm if terrain elevation data stored in database 150 is inaccurate or a position used by system 225 is inaccurate.

Correlator 211 determines an alarm or warning condition by comparing the terrain elevation estimates from generator 209 to the stored terrain elevation data in database 150. If the terrain elevation estimates from generator 209 do not match the stored terrain elevation data, the lack of a match is an indication of an error in the terrain elevation database or the position.

An exemplary correlator method can compute the Root Sum Square (RSS) error for all qualified or high confidence elevation estimates produced by the terrain generator 209 compared to terrain data produced by the terrain database 150. The estimates are preferably qualified by determining whether the estimate contains the appropriate signal-to-noise threshold to make a elevation estimate. In one embodiment, an appropriate signal-to-noise threshold can be above 3 decibels (dB) or above 6 dB. Empirical and historical data can be utilized to determine other criteria for qualified estimates.

Some locations may be limited by limited radar reflectivity or by geometric constraints such as not producing elevation estimates behind terrain features that lie in the shadow of those features. Accordingly, estimates associated with those locations often do not meet the signal-to-noise threshold and are not qualified estimates.

Aircraft 100 preferably includes an antenna system 200 including a tilt control 203, a radar antenna 104, and a receiver/transmitter circuit 102. System 100 preferably includes a processor 208 and a memory 206. System 100 is coupled to display 110 which can be a multi-function flight display, a dedicated display, or any type of visual display. Navigation system 302 or aircraft position sensor 114 provides a position indicative of the actual position of aircraft 100. The position parameter can be used by system 225.

In a preferred embodiment, correlator 211 of weather radar system 100 is configured to determine if terrain elevation estimates from generator 209 matches terrain elevation data from database 150 utilizing a matching algorithm to provide terrain elevation mismatch warnings or position warnings via display 110 or an audio system 112. In one alternative embodiment, correlator 211 can be part of system 302.

Although system 10 and 225 are shown as distinct systems, they can be provided as a signal system or as parts of other systems or other electronics associated with aircraft 100.

System 225 can be any type of TAWS system that uses a terrain elevation database such as database 150. System 225 is preferably coupled to terrain elevation database 150 for receiving terrain elevation data (e.g., terrain elevation and obstacle elevation and location). Database 150 is loaded and available for comparison before use in flight. System 225 can be configured to provide warnings and corrective actions for controlled flight into terrain. System 225 can include basic ground proximity warning system (GPWS) alerts, forward-looking terrain avoidance (FLTA), and premature descent alerting (PDA) functions. System 225 can operate according to FAA technical standard order TSO-C115b.

In one embodiment, antenna 104 can be controlled in a single azimuth sweep while the data used to support terrain elevation estimation is taken by either a vertical monopulse antenna or vertically oriented sequential lobe antenna. In another alternative embodiment, antenna 104 can have vertically swept beams using monopulse antennas and receivers to create terrain elevation data or estimates. Such systems have been utilized in military terrain following and terrain alerting (TF/TA) systems. Advantageously, the use of system 10 allows an existing onboard system of aircraft 100 to provide a low-cost integration for onboard calculation of terrain elevation estimates.

Processor 208 and generator 209 can utilize a variety of techniques for determining or generating terrain elevation estimates for comparison to terrain elevation database 150. In one embodiment, processor 208 is configured to have system 10 provide multiple beams swept in azimuth that have different beam elevations. The multiple beams can be used to determine an angle to terrain features using the difference in return power to estimate the target angle within the beam. Using the range with both this intra-beam angle and the center angle of the beam, the altitude of the terrain can be determined relative to the altitude of aircraft 100. The use of multiple beams is similar to target angle estimation by lobing between different antennas, each pointing at a different elevation in the terrain detection case.

While amplitude differences between antenna beams can be used to estimate target angle location within the beam sets, phase between the beam sets can also be used. In both phase processing monpulse or phase processing sequential lobing systems, a difference in received signal phase is generated as the received signal strikes the average phase center of two or more sections of the antenna at different times as the arrival angle of the radar return signal changes. This difference in arrival time generates a detectable difference in received signal phase in the different antenna sections.

After determining the relative elevation, processor 208 can receive altitude information from aircraft position sensor 114 or system 302 to determine the absolute elevation of the terrain, obstacle, or feature of the terrain. Sensor 114 can be a GPS system, an altimeter, radar altimeter, etc. Alternatively, generator 209 and processor 208 can provide relative terrain data to determine the sensed terrain elevation.

The terrain elevation estimates can be provided in a variety of forms. In the preferred embodiment, terrain elevation estimates are referenced to mean sea-level. Aircraft altitude is generally referenced to mean sea-level. The terrain elevation data is preferably referenced to geographical coordinates (e.g., latitude, longitude, and altitude or relative position with respect to aircraft 100).

Images representative of the terrain elevation data can be displayed as a grayscale or color on an X-Y plane, where colors, darkness or lightness represent terrain elevation. The terrain elevation data can also be provided as a relative terrain with respect to the position of aircraft 100 or flight plan.

In a preferred embodiment, weather radar system 10 is a pulse Doppler radar system. System 10 preferably includes a weather radar return processing unit (e.g., processor 208) that can calculate standard deviations of wind velocities, a mean velocity parameter, a spectral width parameter, a range parameter, a weather elevation parameter and reflectivity parameter to generate turbulence alerts, and to provide a display signal to display 110. System 10 is also capable of recording historical data for use in cell growth analysis. In one embodiment, system 10 detects reflectivity by measuring the power of the returned signal. Velocity is measured by detecting changes in phase angle of returned pulses. Spectral width is measured by detection variation in change of phase angle of returned pulses. Cell elevation is determined by comparing return power levels at different tilt angles or by examining data from a volumetric memory representing different altitudes. Alternatively, system 10 can be a monopulse system.

System 10 can cause display 110 to provide visual indications of mismatches of terrain elevation estimates to terrain elevation data. In one embodiment, audio alerts are also provided on audio equipment 112. Preferably, display 110 can provide hazard warnings or hazard outputs related to weather and terrain/obstacles.

System 10 can be a WXR-2100 MultiScan™ radar system or similar system manufactured by Rockwell Collins configured to include the features associated with generator 208 and correlator 209. According to certain embodiments, system 10 can be an RDR 4000 system or similar system manufactured by Honeywell International, Inc. The principles of the present invention are applicable to any aircraft weather radar system. The present invention is not limited to any type of hardware platform.

In operation, processor 208 of system 10 provides signals, either directly to receiver/transmitter circuit 102 or indirectly through memory 206, to provide radar beams at radar antenna 104. Preferably, processor 208 is configured to operate system 10 as a pulse Doppler multi-scan, multi-tilt angle radar system or a volumetric radar system in which radar beams are produced at more than one tilt angle. Processor 208 receives radar returns through receiver/transmitter circuit 102.

Processor 208 can process the received radar returns (or signals/data related thereto) directly or through memory 206. Receiver/transmitter circuit 102 can be a single path or can have separate circuits for a receive path and a transmit path. Processor 208 can use radar returns to determine a reflectivity parameter, a mean velocity parameter and/or a spectral width parameter for use by system 10. Processor 208 executes software to effect terrain sensing and weather sensing operations.

Preferably, processor 208 includes weather detection software for determining the presence of weather in response to radar returns and a terrain generator 209 for determining the presence of terrain and obstacles in response to radar returns. Generator 209 and correlator 211 preferably operate on the weather radar computing platform associated with system 10 as software modules. Alternatively, generator 209 can use radar returns associated with weather detection to sense terrain elevation.

In one embodiment, terrain elevation estimate generator 209 or system 10 removes data that is related to weather detected by processor 208 before it is used by correlator 211. In this embodiment, system 10 advantageously filters or subtracts out returns from the terrain elevation estimates that are associated with weather features but that are not actual terrain features.

Such a system 10 can utilize various weather detection techniques to determine whether the feature is actual weather. For example, the detected altitude of the feature associated with the weather radar returns can be compared to a generalized terrain elevation database to determine if it is weather or an obstacle (e.g., a feature at an unusually high altitude in a plain region is more likely to be weather than terrain.)

Alternatively, other radar features and signatures can be utilized to determine whether the return is associated with terrain. Doppler conditions can be monitored to detect movement. Doppler mean frequencies can be estimated from radar return data. The difference between the estimated ground modeled Doppler and the radar derived target estimated Doppler frequency may be used to separate ground returns from weather returns. Alternatively, the radar data may be filtered in the frequency domain to reject weather information. Alternatively, the radar system 10 may use high bandwidth and/or short pulse length to reduce returns from weather while still detecting ground returns that may be considered the sum of many point sources at range high resolution.

Correlator 211 receives the terrain elevation map or terrain elevation data generated by terrain elevation estimate generator 209 and matches the terrain elevation data stored in storage 151. Various matching techniques can be utilized. In one embodiment, precipitous terrain matching is utilized to determine the integrity of the stored terrain elevation data in database 150. In less precipitous terrain such as rolling terrain, radar shadows can be utilized to provide matching to the terrain elevation data stored in database 150. By comparing sensed rolling terrain to the terrain elevation data in database 150, a match can be determined.

Terrain may be considered matched if the root mean square (RMS) differences between the radar estimates of terrain height is less than a threshold. Terrain can also be considered matched if the radar shadows seen in radar data match the predicted shadow locations when projecting a virtual radar beam through the terrain database. The matching criteria can again be based on an RMS difference between sensed and predicted ranges of shadow starting and ending ranges. In precipitous terrain, radar reflectivity exhibits a high positive gradient that matches the range of high positive terrain elevation gradients. The range to local maximum gradients can be compared with RMS methods. Where multiple methods may be used, the overall matching score can be combined, with weighting dependent on the relative area of applicability. Empirical data can be utilized to determine the best matching criteria.

Since terrain may be displaced from the radar terrain estimates, various algorithms can be utilized for determining best matches between the terrain estimate produced by the terrain data generator 209 and the terrain database 150. For example, a fourth order type algorithm can be utilized. The fourth order type algorithm matches with respect to left/right, back/forward, counterclockwise rotation/clockwise rotation, and up/down. Utilizing such a fourth order algorithm allows displacement issues to be overcome. The best match between terrain estimates by the radar terrain data generator 209 and the terrain database 150 may be tested for correctness by threshold methods stated above.

In another embodiment, the algorithm can utilize hill climbing techniques or localized slope optimization processes. These processes move the data from left to right, up/down, backward/forward, rotate counterclockwise and clockwise, to find the best match. Preferably, correlator 211 is configured so that once displacement issues are solved, quicker calculations can be made. Other matching techniques can look for boundary shadow or scene matching (e.g., rivers).

While errors in the local terrain database may be discovered with local RMS or peak differences between radar derived terrain elevation estimates and the terrain database, navigation errors may best be discovered by maximizing the match between the terrain database and the radar derived terrain elevation estimate while varying latitude, longitude, and heading offsets. Terrain can be displaced by navigation errors in latitude/longitude or by errors in aircraft heading. Again, a latitude/longitude and/or heading errors may be compared against thresholds to determine whether the navigation is matched.

Figure 2:
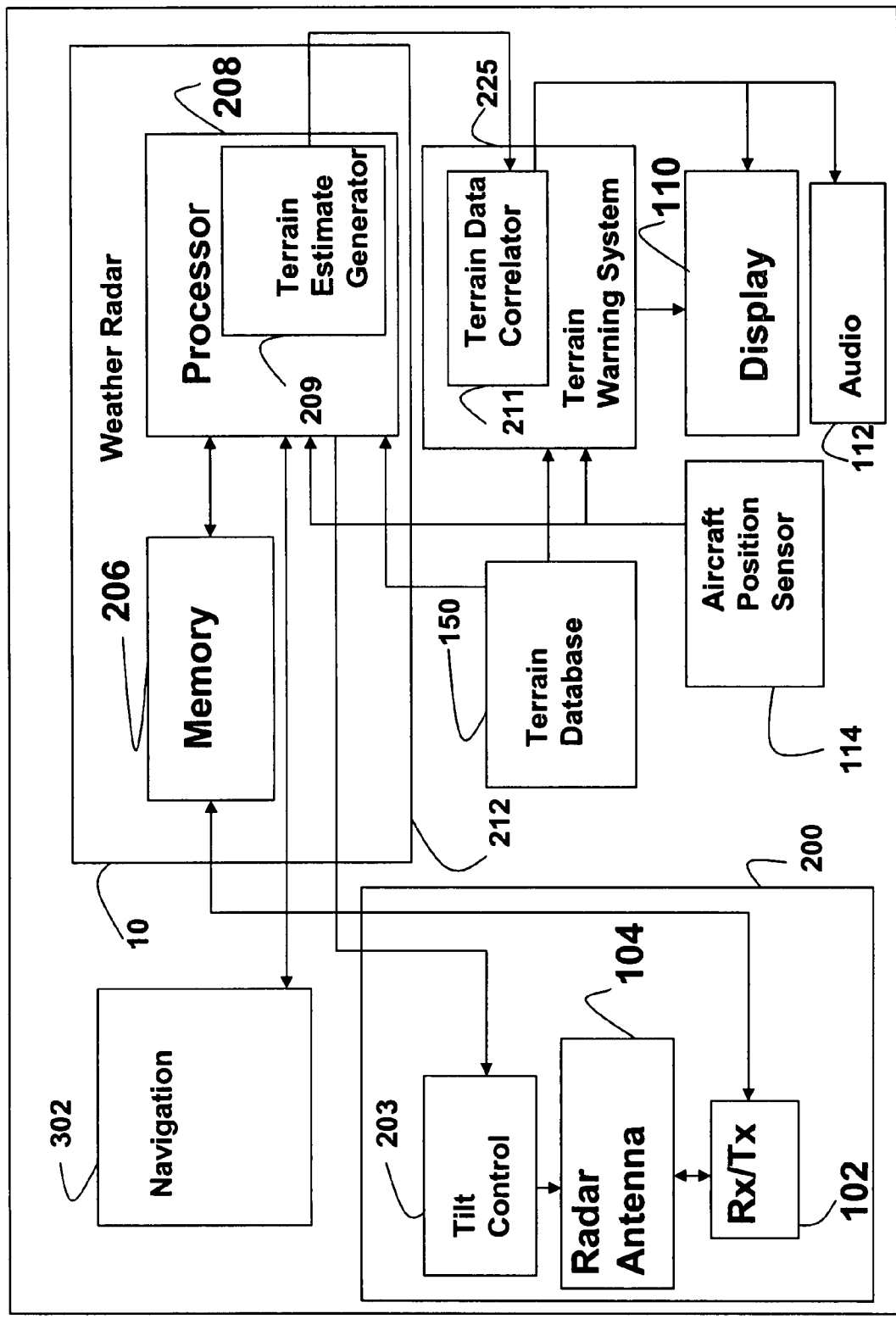
FIG. 2 is a general block diagram of a weather radar system and a terrain warning system including a terrain data correlator in accordance with another exemplary embodiment.

With reference to FIG. 2, aircraft 100 includes terrain elevation estimate generator 209 in weather radar system 10 and terrain data correlator 211 in terrain warning system 225. Terrain data correlator 211 receives sensed terrain elevation data from terrain elevation estimate generator 209 and stored terrain elevation data from terrain elevation database 150. If a match does not exist or the position is incorrect, terrain data correlator 211 can provide a warning to audio system 112 or display 110.

Figure 3:
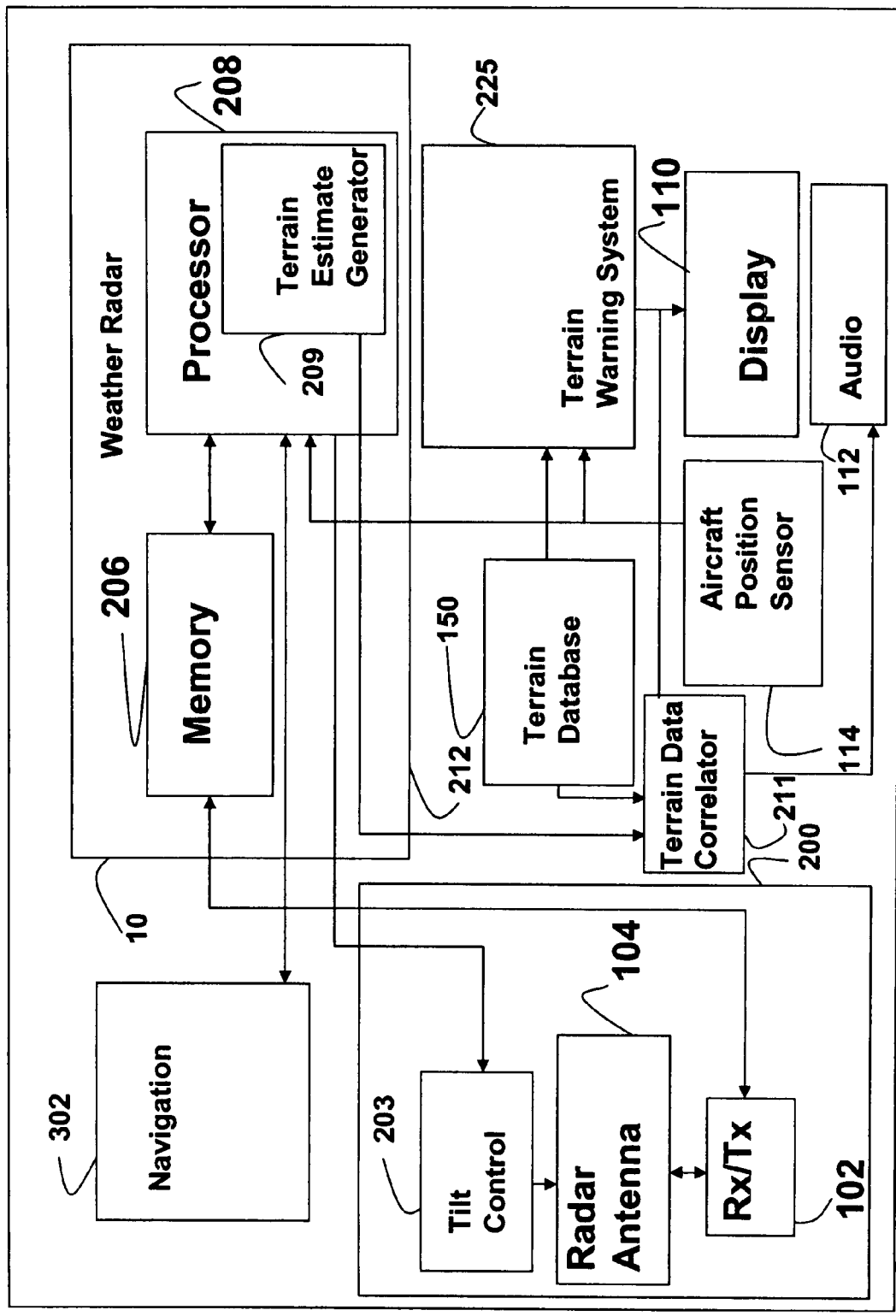
FIG. 3 is a general block diagram of a terrain data correlator for use with a weather radar system and a terrain warning system in accordance with yet another exemplary embodiment.

With reference to FIG. 3, aircraft 100 includes a standalone terrain data correlator 211 that receives sensed terrain elevation data from terrain elevation estimate generator 209 and stored terrain elevation data from terrain elevation database 150. If a match does not exist or the position is incorrect, terrain data correlator 211 can provide a warning to audio system 112 or display 110.

Figure 4:
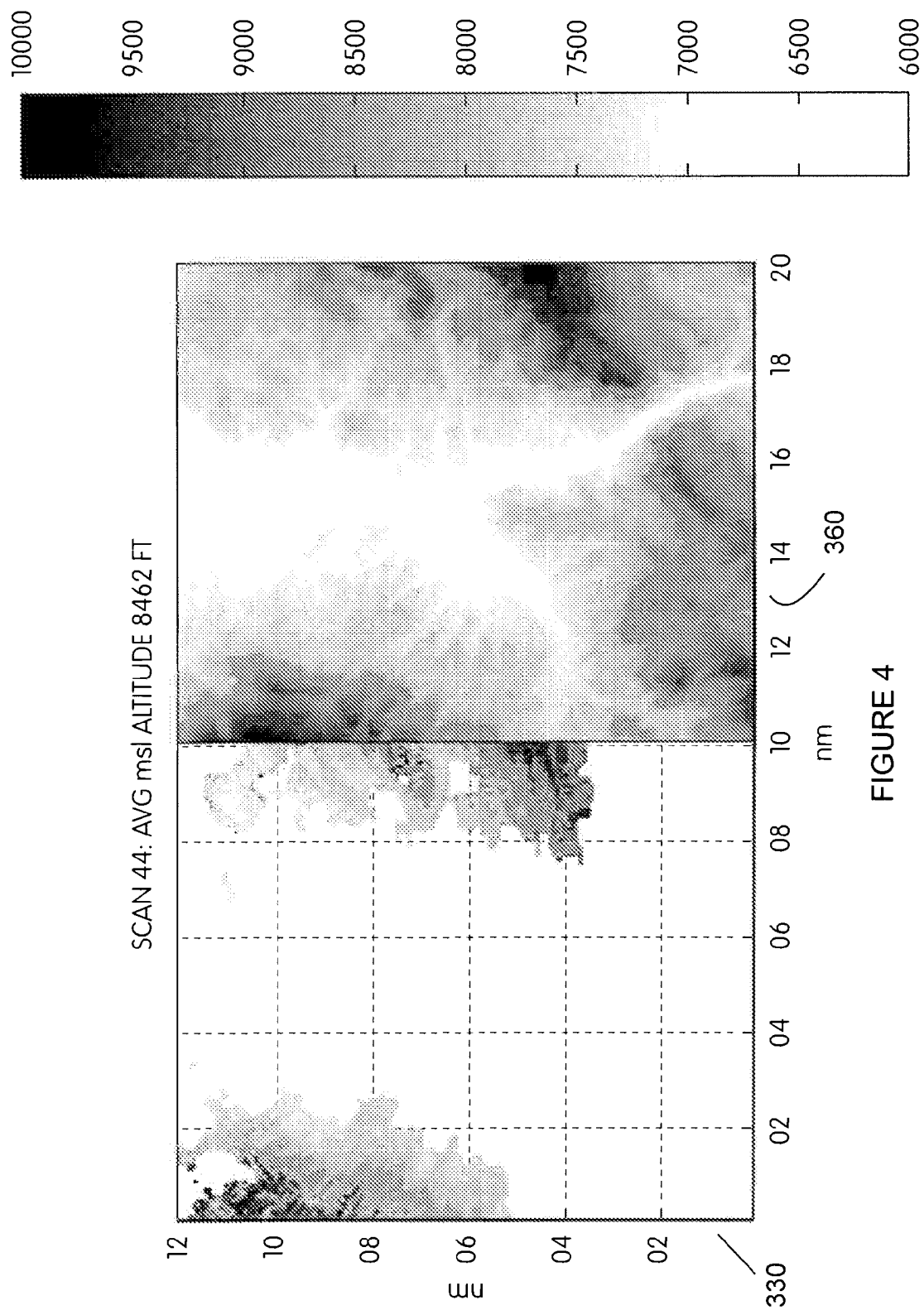
FIG. 4 is a drawing representing terrain elevation estimates sensed by a weather radar system and terrain elevation data from a conventional terrain elevation database in accordance with another exemplary embodiment.

With reference to FIG. 4, terrain elevation estimates generated by weather radar system 10 can be represented as an image 330. Image 330 can be provided on display 110. An image 360 represents a conventional terrain elevation database 150 for the same region.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the radar system devices. For example, the type of device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of using a terrain avoidance system on an aircraft including a weather radar system, the method comprising:
   generating estimates representing terrain elevation using the weather radar system;
   receiving data from a terrain elevation database; and
   providing a warning if the estimates and the data indicate a position error or an error in the estimates or the data.

2. The method of claim 1, wherein the estimates are determined using multiple scan techniques.

3. The method of claim 1, wherein the power ratio associated with weather radar returns is used to determine the estimates.

4. The method of claim 3, wherein the weather radar returns are from multiple beams swept in azimuth and with different beam elevations.

5. The method of claim 1 wherein the phase difference of two or more beams is used to determine the estimates.

6. The method of claim 1, wherein the warning indicates a position error.

7. A method of using a terrain avoidance system on an aircraft including a weather radar system, the method comprising:
   generating estimates representing terrain elevation using the weather radar system;
   receiving data from a terrain elevation database; and
   providing a warning if the estimates and the data indicate a position error or an error in the estimates or the data, wherein the warning is provided in response to an algorithm for comparing radar shadows associated with the estimates to the data.

8. The method of claim 1, wherein the warning is provided in response to a hill climbing algorithm.

9. An aircraft weather radar system for use with a terrain avoidance system, the weather radar system being coupled to an antenna, the weather radar system comprising:
   a processor for receiving radar returns received by the antenna, the processor determining terrain elevation data for use with the terrain avoidance system from the radar returns, the terrain elevation data being compared to stored data used with the terrain avoidance system to verify position or to check the integrity of the stored data.

10. The system of claim 9, wherein the position is derived from global positioning system (GPS) signals, or other position determining means and the position is compared to a position determined from the terrain data.

11. The system of claim 9, wherein the returns include weather radar returns, wherein the processor receives the weather radar returns associated with weather, wherein the processor removes the weather radar returns before determining the terrain elevation data.

12. The system of claim 9, wherein the weather radar system is a multi-scan system.

13. The system of claim 9, wherein a warning is provided when the terrain elevation data does not match the stored data.

14. An aircraft weather radar system for use with a terrain avoidance system, the weather radar system being coupled to an antenna, the weather radar system comprising:

a processor for receiving radar returns received by the antenna, the processor determining terrain elevation data for use with the terrain avoidance system from the radar returns, the terrain elevation data being compared to stored data used with the terrain avoidance system to verify position or to check the integrity of the stored data, wherein the terrain elevation data is related to radar shadows.

15. The system of claim 9, wherein the processor matches the terrain elevation data to the stored data using a fourth order algorithm, the fourth order algorithm being executed by the processor.

16. The system of claim 15, wherein the fourth order algorithm matches the stored data and the terrain elevation data with respect to a left, right orientation, an up and a down orientation, a rotationally clockwise, rotationally counter-clockwise orientation, wherein the processor matches the terrain elevation data to the stored data.

17. The system of claim 14, wherein the processor executes a hill climbing algorithm to match the terrain elevator data to the stored data.

18. An apparatus for an aircraft terrain avoidance system, the apparatus comprising:

a first input for receiving terrain estimates derived from a weather radar system;

a second input for receiving terrain data stored onboard the aircraft; and a means for comparing the terrain elevation estimates derived from a weather radar system and the terrain elevation data.

19. The apparatus of claim 18, wherein the first input is within an onboard weather radar system.

20. The apparatus of claim 18, wherein a fourth order hill climbing algorithm is used by the means for comparing.

* * * * *